(12) United States Patent
Karlsson et al.

(10) Patent No.: US 9,847,729 B2
(45) Date of Patent: Dec. 19, 2017

(54) METHOD OF OPERATING A SWITCHED MODE POWER SUPPLY, COMPUTER PROGRAM, AND SWITCHED MODE POWER SUPPLY

(71) Applicant: Telefonaktiebolaget L M Ericsson (publ), Stockholm (SE)

(72) Inventors: Magnus Karlsson, Oskarshamn (SE); Jonas Malmberg, Farjestaden (SE); Oscar Persson, Kalmar (SE); Fredrik Wahledow, Farjestaden (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 29 days.

(21) Appl. No.: 14/895,342

(22) PCT Filed: Jan. 21, 2015

(86) PCT No.: PCT/SE2015/050049
§ 371 (c)(1),
(2) Date: Dec. 2, 2015

(87) PCT Pub. No.: WO2016/118051
PCT Pub. Date: Jul. 28, 2016

(65) Prior Publication Data
US 2016/0365800 A1 Dec. 15, 2016

(51) Int. Cl.
*H02M 3/335* (2006.01)
*H02M 1/14* (2006.01)
(Continued)

(52) U.S. Cl.
CPC ......... *H02M 3/33546* (2013.01); *H02M 1/14* (2013.01); *H02M 3/337* (2013.01); *H02M 2001/0045* (2013.01)

(58) Field of Classification Search
CPC ........... H02M 1/14; H02M 2001/0045; H02M 3/33546; H02M 3/337
See application file for complete search history.

(56) References Cited

U.S. PATENT DOCUMENTS 6,034,515 A * 3/2000 Hirmer ................. H02H 9/001
323/277
7,787,261 B2 8/2010 Farrington et al.
(Continued)

FOREIGN PATENT DOCUMENTS

EP 2438671 B1 9/2010
WO 2013156079 A1 10/2013

OTHER PUBLICATIONS

Barry, Mike, "Design Issued in Regulated and Unregulated Intermediate Bus Converters", 2004 IEEE, pp. 1389-1394.
(Continued)

*Primary Examiner* — Adolf Berhane
*Assistant Examiner* — Bart Iliya
(74) *Attorney, Agent, or Firm* — Boisbrun Hofman, PLLC

(57) ABSTRACT

A method of operating a switched mode power supply comprising a switched mode converter and a control arrangement. The switched mode converter converts an input voltage to an output voltage and includes a primary winding, controllable switch based circuitry connecting the input voltage over the primary winding, a secondary winding coupled to the primary winding, and an LC filter including an inductive element and a capacitive element, wherein the output voltage is obtained as the voltage over the capacitive element and a duty cycle of the switched mode converter can be controlled by controlling the switch based circuitry. The switched mode converter is controlled depending on measurements of the input and output voltages in a hybrid regulated ratio control scheme. The power of the switched mode power supply is shut off or a current thereof (Continued)

is limited, when a current of the switched mode power supply reaches a maximum current.

18 Claims, 5 Drawing Sheets

(51) Int. Cl.
    *H02M 3/337*     (2006.01)
    *H02M 1/00*     (2006.01)

(56) References Cited

U.S. PATENT DOCUMENTS

| | | | |
|---|---|---|---|
| 2005/0242792 | A1 | 11/2005 | Zinn |
| 2006/0273740 | A1* | 12/2006 | Saeueng ............ H02J 1/102 315/291 |
| 2008/0278225 | A1* | 11/2008 | Hu ............... H02M 3/33507 327/543 |
| 2011/0185145 | A1* | 7/2011 | Moro ............... G06F 13/1605 711/167 |
| 2012/0098553 | A1* | 4/2012 | Karlsson ............ G01R 27/2605 324/684 |

OTHER PUBLICATIONS

Ericsson, PKM 4613NH PI series Direct Converters Input 36-75 V, Output up to 50 A/600 W Technical Specification, Dec. 2014, 23 pages.

International Search Report for PCT international application No. PCT/SE2015/050049 dated Sep. 23, 2015, 4 pages.

* cited by examiner

METHOD OF OPERATING A SWITCHED MODE POWER SUPPLY, COMPUTER PROGRAM, AND SWITCHED MODE POWER SUPPLY

CROSS-REFERENCE TO RELATED APPLICATION

This application is the National Stage of, and therefore claims the benefit of, International Application No. PCT/SE2015/050049 filed on Jan. 21, 2015, entitled "Method of Operating a Switched Mode Power Supply, Computer Program, and Switched Mode Power Supply." The above-referenced application is commonly assigned with this National Stage application and is incorporated herein by reference in its entirety.

TECHNICAL FIELD

The technical field relates generally to switched mode power supplies and methods of operating switched mode power supplies. The switched mode power supplies may be mounted in base stations of a mobile communication network.

BACKGROUND

In most switched mode power supply (SMPS) topologies, the output voltage is directly proportional to the input voltage $V_O \propto nDV_I$, where D is the duty cycle, and n is the transformer ratio if a transformer is used in the SMPS.

Fixed ratio converters or intermediate bus converters, also referred to as unregulated converters, which lack control of the output voltage, run with a fixed maximized duty cycle. This yields maximized power efficiency since the converter transfer energy almost 100% of the time, with the exception of the dead time needed during switching. With this strategy the output voltage varies with the input voltage according to the above equation. The narrow regulation of the voltage is taken care of by a second layer SMPS referred to as point of load regulators. This power architecture is referred to as intermediate bus architecture, see U.S. Pat. No. 7,787,261 B1.

Semi-regulated converters compensate for the varying input voltage (line regulation) at the expense of a varying duty cycle which reduces the power efficiency. The load affects the output voltage and the output voltage decreases with increasing load, also known as drop. Since the output of a SMPS has an LC filter, load transients cause the output voltage to oscillate, where only the inherent parasitic resistances dampen the oscillations.

Quasi-regulated bus converters, which are described in the above cited U.S. Pat. No. 7,787,261 B1, are line regulated in only one portion of the input voltage range, whereas in other portions of the input voltage range, the converters are unregulated using 100% duty cycle. This yields an increased input voltage range without increasing the output voltage range.

Output regulated converters compensate for varying load conditions and input voltage changes by feedback of the output voltage. Voltage feed forward control is often employed in order to reduce output voltage disturbances due to input voltage transients. This type of regulation offers the most stable output voltage at the cost of lower efficiency.

SUMMARY

It is an aim to provide a method of operating a switched mode power supply (SMPS) and an SMPS, with improved current and power capabilities as compared as those of the prior art SMPSs.

A first aspect refers to a method of operating an SMPS comprising a switched mode converter and a control arrangement. The switched mode converter is provided for converting an input voltage to an output voltage and includes, on a primary side, a primary winding and a controllable switch based circuitry connecting the input voltage over the primary winding, and, on a secondary side, a secondary winding coupled to the primary winding, and an LC filter including an inductive element and a capacitive element, wherein the output voltage is obtained as the voltage over the capacitive element and wherein the duty cycle of the switched mode converter can be controlled by controlling the switch based circuitry. According to the method, measurements of the input and output voltages are constantly received, the switched mode converter is controlled depending on the measurements of the input and output voltages in a hybrid regulated ratio control scheme, a maximum current, or current limit, which is dependent on the measured input voltage, is provided, and the power of the SMPS is shut off, or the current thereof is limited, when a current of the SMPS reaches the maximum current.

The provided maximum current may be decreasing with increasing input voltage.

The maximum current may be fixed when the switched mode converter is controlled in a regulated ratio region employing a fixed duty cycle.

The maximum current may also be fixed when the switched mode converter is controlled in a fully regulated ratio region maintaining a fixed output voltage. However, then the fixed maximum current is higher in the regulated ratio region than in the fully regulated ratio region.

Alternatively, the maximum current is decreasing with increasing input voltage when the switched mode converter is controlled in the fully regulated ratio region.

The maximum current may be determined depending on an input voltage dependent estimated current ripple output from the switched mode converter.

More in detail, the maximum current may be dependent on an available current $I_{out}$ which can be determined based on the estimated current ripple output from the switched mode converter using the following equation $$I_{out} = I_{sat} - I_{pk-pk}/2$$

wherein $I_{sat}$ is the saturation current for the inductive element and $I_{pk-pk}$ is the peak-to-peak ripple current, which is equal to $I_{RR}$ when the switched mode converter is controlled in a regulated ratio region, wherein the output voltage follows the input voltage, and $I_{RR}$ is given by $$I_{RR} = \frac{nV_I - V_O}{L}DT_{sw} = \frac{nV_I - nD_{nom}V_I}{L}D_{nom}T_{sw} = \frac{nV_I T_{sw}}{L}(1 - D_{nom})D_{nom}$$

Where $$V_O = nD_{nom}V_I$$

and equal to $I_{HRR}$ when the switched mode converter is controlled in a regulated ratio region, wherein a fixed output voltage is maintained, and $I_{HRR}$ is given by $$I_{HRR} = \frac{nV_I - V_O}{L} DT_{sw} = \frac{T_{sw}}{L}(nV_I - V_O)\frac{V_O}{nV_I} = \frac{T_{sw}}{L}V_O(1-D)$$

where $$D = \frac{V_O}{nV_I}$$

where n is the transformer ratio, D is the duty cycle, $D_{nom}$ is the nominal duty cycle used in the regulated ratio region, L is the inductance of the inductive element, and $T_{sw}$ is the switching period of the switch based circuitry of the switched mode converter.

The maximum current may be equal to the available current calculated according to the above.

Alternatively, the maximum current is lower than the available current to obtain a safety margin to saturation.

Further, the maximum current may be determined to allow the inductive element to operate in its non-linear region when the switched mode converter is controlled in the regulated ratio region, and the maximum current maybe equal to, or lower than, the available current when the switched mode converter is controlled in the fully regulated ratio region.

The maximum current may be provided as a table with a plurality of input voltage values, and for each of the plurality of input voltage values, a maximum current value for that input voltage.

Measurements of the current of the SMPS may constantly be received, and the last received measured current may be compared with the maximum current for the last measured input voltage to determine whether the power should be shut-off or the current should be limited.

By means of the method above, the reduced current ripple at lower input voltages can be utilized as an increased maximum output current. In an exemplary embodiment, the maximum output current can be increased with about 13% in the regulated ratio region.

Using the disclosed input voltage dependent available current, an increase of available power over the whole input voltage range can be obtained. The maximum available power at the lower end of the input voltage can be almost as high as the maximum available power in the fully regulated ratio region, i.e. with constant output voltage.

A second aspect refers to computer program for a SMPS comprising a switched mode converter and a control arrangement for controlling the switched mode converter. The switched mode converter is provided for converting an input voltage to an output voltage and includes, on a primary side, a primary winding and a controllable switch based circuitry connecting the input voltage over the primary winding, and, on a secondary side, a secondary winding coupled to the primary winding, and an LC filter including an inductive element and a capacitive element, wherein the output voltage is obtained as the voltage over the capacitive element and wherein the duty cycle of the switched mode converter can be controlled by controlling the switch based circuitry.

The computer program comprises computer-executable instructions which, when run on the control arrangement, causes the control arrangement to perform the following steps: constantly receiving measurements of the input and output voltages, controlling the switched mode converter depending on the measurements of the input and output voltages in a hybrid regulated ratio control scheme, providing a maximum current, which is dependent on the measured input voltage, and shutting off the power, or limiting the current, of the SMPS when a current of the SMPS reaches the maximum current.

The computer program may comprise computer-executable instructions to perform any of the embodiments of the method disclosed above with reference to the first aspect.

A third aspect refers to a computer program product comprising the computer program of the second aspect and a computer readable structure, in which the computer program is stored.

A fourth aspect refers to an SMPS comprising a switched mode converter and a control arrangement for controlling the switched mode converter. The switched mode converter is provided for converting an input voltage to an output voltage and includes, on a primary side, a primary winding and a controllable switch based circuitry connecting the input voltage over the primary winding, and, on a secondary side, a secondary winding coupled to the primary winding, and an LC filter including an inductive element and a capacitive element, wherein the output voltage is obtained as the voltage over the capacitive element and wherein the duty cycle of the switched mode converter can be controlled by controlling the switch based circuitry. The control arrangement comprises a control module connected to constantly receive measurements of the input and output voltages and configured to control the switched mode converter depending on the measurements of the input and output voltages in a hybrid regulated ratio control scheme. Further, the control arrangement comprises a power shut-off or current limiting module connected to constantly receive measurements of the input voltage and configured to shut off the power, or limit the current, of the SMPS when a current of the SMPS reaches a maximum current, which is dependent on the measured input voltage.

The SMPS may be operated in accordance with any of the schemes disclosed above with reference to the first aspect.

The controllable switch based circuitry on the primary side of the SMPS may be any of a full bridge, half bridge, or push-pull based circuitry. The switched mode converter may comprise, on the secondary side, secondary side circuitry, e.g., comprising any of a single winding or double center-tapped winding based circuitry. The converter may be provided with synchronous or non-synchronous rectification circuitry.

In one embodiment, the controllable switches may comprise four switches in two legs with two switches in each of the two legs, wherein each of the legs may be connected in parallel with the input voltage, and a point between the switches of a first one of the legs may be connected to one end of the primary winding and a point between the switches of a second one of the legs may be connected to the other end of the primary winding. The switches in the two legs may each comprise a MOSFET transistor.

The control arrangement may be configured to control the controllable switches to switch between a connected state wherein the primary winding is connected to the input voltage and a disconnected state wherein the input voltage is disconnected from the primary winding, to thereby control the duty cycle. The control arrangement may be configured to control the controllable switches to switch such that the current direction through the primary winding is altered every time the primary winding is connected to the input voltage.

The switched mode converter may be a DC-DC converter, e.g. a DC-DC voltage down-converter, e.g. configured to operate with input and output voltages in the range of 10-100 V.

A fifth aspect refers to a base station comprising the SMPS of the fourth aspect.

Further characteristics and advantages will be evident from the detailed description of embodiments given hereinafter, and the accompanying FIGS. 1-10, which are given by way of illustration only.

DETAILED DESCRIPTION

Figure 1:
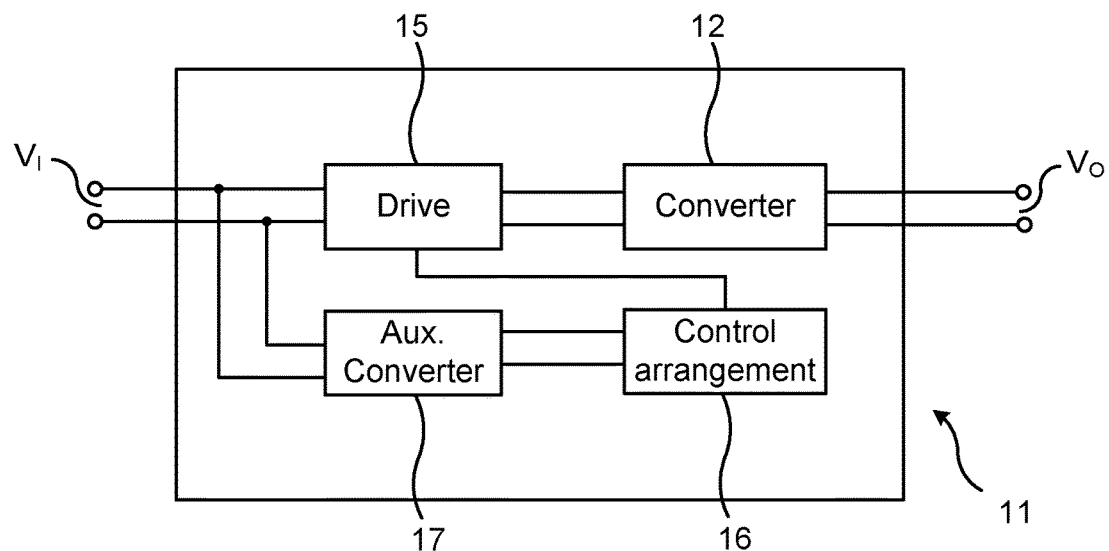
FIG. 1 illustrates, schematically, in a block diagram an embodiment of a switched mode power supply (SMPS).

FIG. 1 illustrates, schematically, an embodiment of a switched mode power supply (SMPS) 11 comprising a switched mode converter 12 for converting an input voltage $V_I$ to an output voltage $V_O$, a drive 15 for driving the converter 12, a control arrangement 16 for controlling the drive 15 and thus the operation of the converter 12, and a housekeeping or auxiliary converter 17 for down converting the input voltage $V_I$ to a voltage suitable for the control arrangement 16, such that the control arrangement 16 can be powered by the input voltage $V_I$.

The converter 12 may be an isolated DC-DC converter, typically down-converting the input voltage $V_I$ to a suitable output power $V_O$. The converter 12 may typically operate with input $V_I$ and output $V_O$ voltages in the range of 10-100 V.

Figure 2:
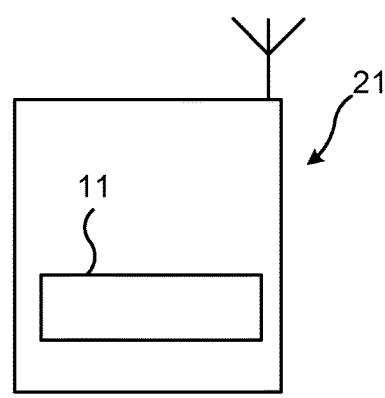
FIG. 2 illustrates, schematically, an embodiment of a base station comprising one or more of the SMPS of FIG. 1.

FIG. 2 illustrates, schematically, an embodiment of a base station 21 comprising one or more of the SMPS 11 of FIG. 1.

Figure 3:
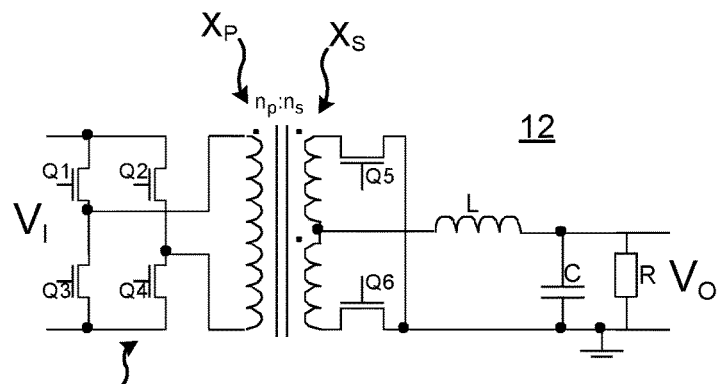
FIG. 3 illustrates, schematically, in a block diagram, an embodiment of a converter, which can be used in the SMPS of FIG. 1.

FIG. 3 illustrates, schematically, in a circuit diagram, an embodiment of a converter, which can be used in the SMPS 11 of FIG. 1, wherein a switched primary windings transformer is driven by an extended full-bridge switch circuitry.

The converter comprises, on a primary side, a primary winding $X_p$ and a controllable switch based circuitry 31 connecting the input voltage $V_I$ over the primary winding $X_p$. The primary winding $X_p$ comprises $n_p$ winding turns. The switch based circuitry 31 comprises controllable switches $Q_1$, $Q_3$, $Q_2$, $Q_4$ capable of switching to thereby control the duty cycle of the converter.

The switches $Q_1$, $Q_3$, $Q_2$, $Q_4$ are arranged in two legs with two switches in each of the two legs, wherein each of the legs is connected in parallel with the input voltage $V_I$, and a point between the switches $Q_1$, $Q_3$ of a first one of the legs is connected to one end of the primary winding $X_p$ and a point between the switches $Q_2$, $Q_4$ of the second one of the legs is connected to the other end of the primary winding $X_p$.

The converter 12 comprises, on a secondary side, a secondary winding $X_s$ coupled to the primary winding $X_p$ and an LC filter including an inductive element L connected to the secondary winding $X_s$ and a capacitive element C, over which the output voltage $V_O$ is obtained. The secondary winding $X_s$ may be a double winding having $n_s$ number of winding turns in each winding and switches $Q_5$ and $Q_6$ are provided for secondary side switching in a customary manner. A resistor R may be connected over the capacitive element C.

The control arrangement 16 of the SMPS 11 is operatively connected to monitor the input $V_I$ and output $V_O$ voltages and is configured to control the controllable switches $Q_1$, $Q_3$, $Q_2$, $Q_4$ to control the duty cycle of the converter 12.

To obtain a suitable duty cycle, the control arrangement 16 may be configured to control the controllable switches $Q_1$, $Q_3$, $Q_2$, $Q_4$ to switch between a connected state wherein the primary winding $X_p$ is connected to the input voltage $V_I$ and a disconnected state wherein the input voltage $V_I$ is disconnected from the primary winding $X_p$. The control arrangement 16 can be arranged on the primary or on the secondary side of the converter.

Figure 4:
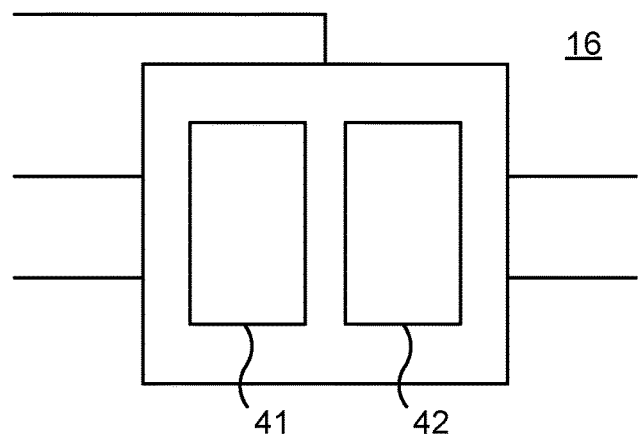
FIG. 4 illustrates, schematically, in a block diagram, an embodiment of a control arrangement, which can be used in the SMPS of FIG. 1.

FIG. 4 illustrates, schematically, in a block diagram, an embodiment of a control arrangement 16, which can be used in the SMPS 11 of FIG. 1. The control arrangement 16 comprises a control module 41 for the control of the drive 15, and a power shut-off or current limiting module 42 for shutting off the power, or limiting the current, of the SMPS 11.

The control module 41 is connected to constantly receive measurements of the input $V_I$ and output $V_O$ voltages and is configured to control the switched mode converter 12 depending on the measurements of the input $V_I$ and output $V_O$ voltages in a hybrid regulated ratio control scheme, wherein at higher input voltages, the switched mode converter 12 is controlled using fully regulated ratio control with a constant reference voltage, and at lower input voltages, the switched mode converter 12 is controlled using regulated ratio control with a reference voltage, which follows the input voltage.

The power shut-off or current limiting module 42 is connected to constantly receive measurements of the input voltage $V_I$ and is configured to shut off the power, or limit the current, of the SMPS 11 when a current of the SMPS 11 reaches a maximum current.

Figure 5:
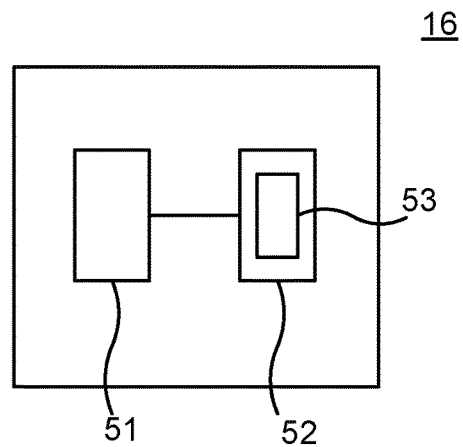
FIG. 5 illustrates, schematically, in a block diagram, an embodiment of an implementation of the control arrangement of FIG. 4.

FIG. 5 illustrates, schematically, in a block diagram, an embodiment of an implementation of the control arrangement 16 of FIG. 4. The control arrangement 16 may be implemented by, or comprise, a microcomputer or a microcontroller and may comprise a processor 51, a storage medium 52 operatively connected to the processor 51, and a suitable computer program 53 comprising computer-executable instructions and stored on the storage medium 52, wherein the processor 51 is configured to execute the computer-executable instructions of the computer program 53 to thereby cause the control arrangement 16 to control the drive 15 and/or shut off the power, or limit the current, of the SMPS 11 as disclosed in this document.

The storage medium 52 may be a random access memory (RAM), a flash memory, or a hard disk drive. The storage medium 52 may be a computer program product comprising the computer program 53. Alternatively, the computer program 53 may be transferred to the storage medium 52 by means of a suitable computer program product, such as a digital versatile disc (DVD), compact disc (CD), or a memory stick. As a further alternative, the computer program 53 may be downloaded to the storage medium 52 over a network.

The control arrangement 16 may alternatively be implemented in the form of a digital signal processor (DSP), an application specific integrated circuit (ASIC), a field-programmable gate array (FPGA), a complex programmable logic device (CPLD), or similar.

Figure 6:
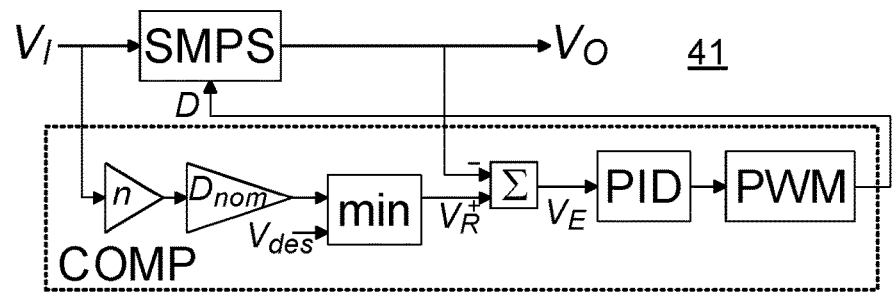
FIG. 6 illustrates, schematically, in a block diagram an embodiment of a control module for the converter of FIG. 3 to implement hybrid regulated ratio control.

FIG. 6 illustrates, schematically, in a block diagram an embodiment of a control module 41 for the converter 12 of FIG. 3 in order to implement the hybrid regulated ratio control.

The output voltage is fed back to the control module 41, while the following reference voltages are used:
(i) At higher input voltages, the reference voltage is set to fixed desired value $V_{des}$ and the output voltage $V_O$ is regulated towards this value using e.g. a PID-regulator PID and a pulse width modulator PWM to control the duty cycle D. For a desired output of 60 V, the fixed reference voltage $V_{des}$ is used for input voltages in the range of for instance 50-60 V.
(ii) At lower input voltages, the reference voltage is set equal to the input voltage $V_I$, wherein the output voltage $V_O$ is regulated to follow the input voltage using a nominal (fixed) duty cycle $D_{nom}$. This regulated ratio control may be performed for instance at input voltages lower than 50 V. In this range, the output voltage $V_O$ is allowed to drop below the fixed desired value $V_{des}$, whereby load and line transient suppression is obtained.

The above control strategy is simply accomplished by letting the reference voltage $V_R$ be equal to $$V_R = \min\{nD_{nom}V_I, V_{des}\} \quad \text{(Eq. 1)}$$

where min is the minimum function selecting the minimum value of the operands, n is the transformer ratio, $D_{nom}$ is the nominal duty cycle used in the regulated ratio region. The control scheme with the reference voltage as given by Eq. 1 is used in the control module 41 illustrated in FIG. 6.

The current in the inductor L on the secondary side of the converter 12 is described by the following equation.

$$I = \frac{1}{L}\int_0^T v(t)dt \quad \text{(Eq. 2)}$$

For fixed ratio control, using Eq. 2 and assuming the output voltage change during a switch cycle is small, the peak-to-peak ripple current $I_{FR}$ can be approximated by $$I_{FR} = \frac{nV_I - V_O}{L}DT_{sw} = \frac{nV_I - nV_I}{L}T_{sw} = 0 \quad \text{(Eq. 3)}$$

$$V_O = nV_I, D = 1$$

where $T_{sw}$ is the switching period of the switches of the converter 12.

Since the duty cycle essentially is unity, the ripple current becomes almost zero. This is why the inductor L on the secondary side of the converter 12 can be so small; it is required only for handling the dead time when switching is performed.

For regulated ratio control, a nominal duty cycle $D_{nom}$ of about 95% gives enough headroom for handling of load transients and load regulations while the converter 12 is kept fully regulated. The peak-to-peak ripple current $I_{RR}$ becomes $$I_{RR} = \frac{nV_I - V_O}{L}DT_{sw} = \quad \text{(Eq. 4)}$$

$$\frac{nV_I - nD_{nom}V_I}{L}D_{nom}T_{sw} = \frac{nV_I T_{sw}}{L}(1 - D_{nom})D_{nom}$$

Where $$V_O = nD_{nom}V_I$$

For hybrid regulated ratio control, wherein the converter 12 is run with a constant output voltage, i.e. using fully regulated ratio control, the peak-to-peak current ripple $I_{HRR}$ becomes $$I_{HRR} = \frac{nV_I - V_O}{L}DT_{sw} = \frac{T_{sw}}{L}(nV_I - V_O)\frac{V_O}{nV_I} = \frac{T_{sw}}{L}V_O(1 - D) \quad \text{(Eq. 5)}$$

where $$D = \frac{V_O}{nV_I}$$

In order to avoid saturation in the inductor L on the secondary side of the converter 12, the current it has to withstand is the sum of the DC current $I_{DC}$ and half the peak-to-peak ripple current $I_{pk-pk}$ (i.e. $I_{RR}$ in the regulated ratio region and the $I_{HRR}$ in the fully regulated ratio control region) since the saturation current $I_{sat}$ fulfills the following expression $$I_{sat} \geq I_{DC} + I_{pk-pk}/2 \quad \text{(Eq. 6)}$$

Since the peak-to-peak ripple current in the regulated ratio region is smaller, this can be utilized to increase the output current capability in the regulated ratio region. Since the available current is dependent on the input voltage $V_I$, the corresponding DC current limit, i.e. maximum current, can also be made dependent on the input voltage $V_I$.

Figure 7:
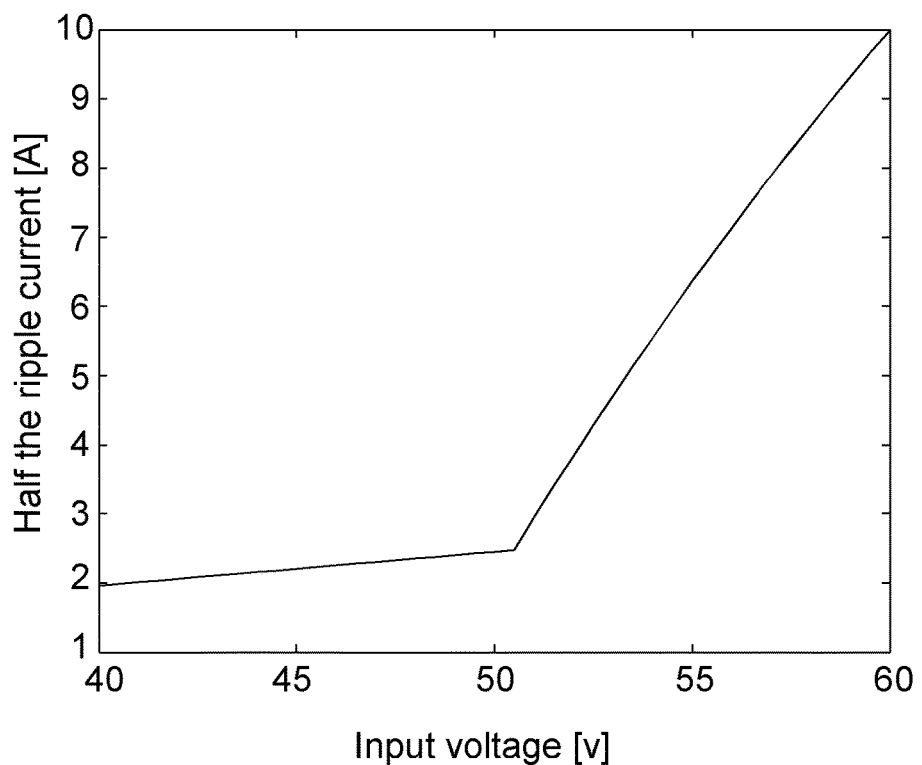
FIGS. 7-9 illustrate, in respective diagrams, half the ripple current, available current, and available output power as a function of the input voltage for an example embodiment of the SMPS of FIG. 1 with the converter of FIG. 3 and the control module of FIG. 6.

FIG. 7 illustrates, in a diagram, half the peak-to-peak ripple current as a function of the input voltage for an example embodiment of an SMPS using hybrid ratio control.

The SMPS has the following parameter values: the inductance of the inductor L is 0.4 µH, the switching frequency of the switches of the converter $F_{sw}$=400 kHz, the transformer ratio n=$n_s$/$n_p$=1/4, the desired output voltage, $V_o$=12 V, the corner voltage, i.e. the minimum voltage for maintaining $V_o$=12 V, $V_{in-corner}$=50.5 V, the maximum input voltage $V_{in-max}$=60 V, and the nominal duty cycle $D_{nom}$=12/(50.5*1/4)=0.9505 at the corner voltage and in the regulated ratio region.

It can be noted that half the ripple current is very low in the regulated ratio region (with constant duty cycle), but increases sharply when switching into the fully regulated ratio region (with constant output voltage).

In order to have a maximum output current of 60 A, the saturation current for the inductor has to be $I_{sat}$=60+$I_{pk-pk}$/2=70 A.

The reduced current ripple at lower input voltages can be utilized as an increased available output current, which will thus be input voltage dependent. The available current $I_{out}$ becomes $$I_{out} = I_{sat} - I_{pk-pk}(V_I)/2 \quad \text{(Eq. 7)}$$

Figure 8:
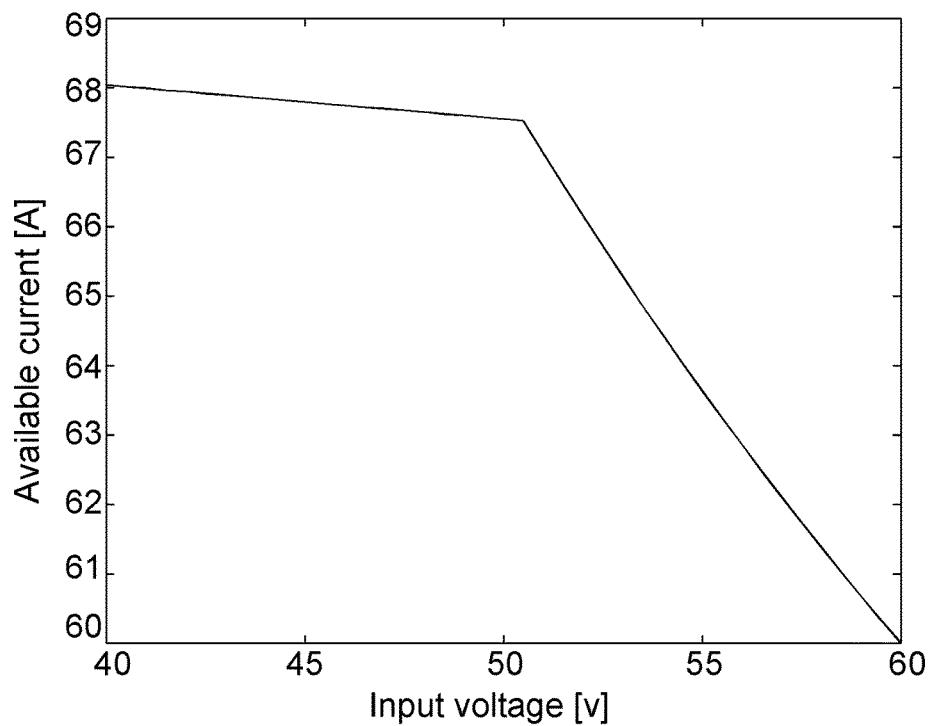

The available current $I_{out}$ as a function of the input voltage is illustrated, in a diagram, in FIG. 8. Hence, the available current $I_{out}$ can be increased with 7-8 A in the regulated ratio region, which is a 13% increase.

Figure 9:
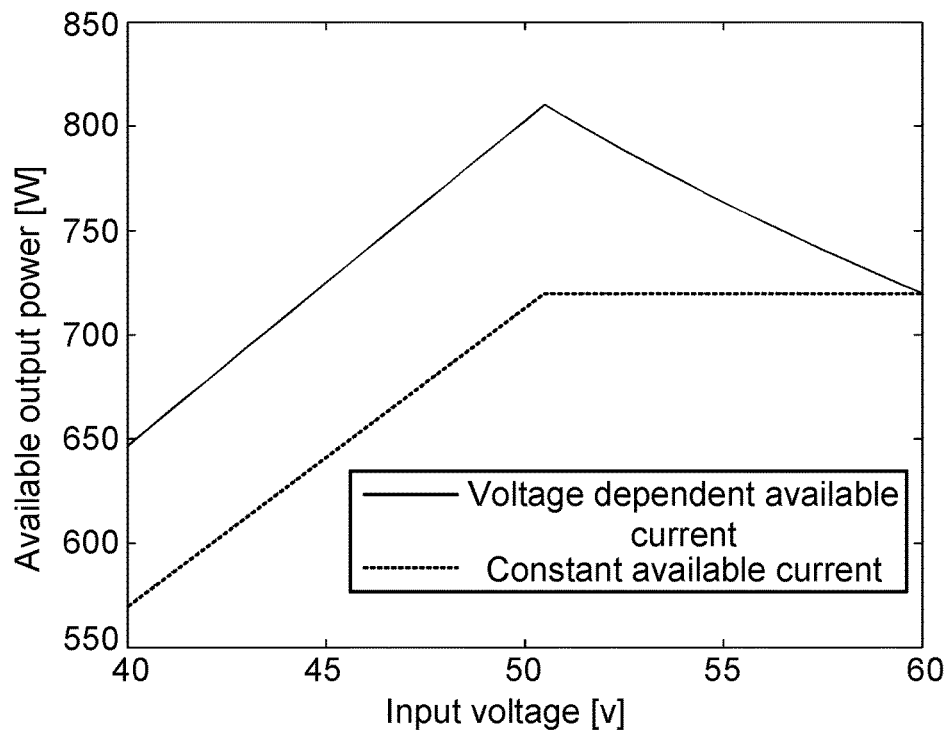

The available power as a function of input voltage for an input voltage dependent available current (solid line) and for a standard constant available current (dotted line) can be compared in the diagram of FIG. 9. Employing an input voltage dependent available current, an increase of available power over the whole input voltage range can be obtained. By employing an input voltage dependent available current, the available power at the lower end of the input voltage becomes almost as high as the available power in the fully regulated ratio region, i.e. with constant output voltage.

Thus, the power shut-off or current limiting module 42 of the control arrangement 16 (see FIG. 4) is configured to shut off the power, or limit the current, of the SMPS 11 when a current of the SMPS 11 reaches a maximum current, a current limit, which is dependent on the measured input voltage.

The maximum current may be equal to the available current $I_{out}$.

Alternatively, some safety margin, such as e.g. 5 or 10% is used, so that the maximum current will be equal to the 0.95 $I_{out}$ or 0.9 $I_{out}$.

The power shut-off or current limiting module 42 may be connected to constantly receive measurements of the current of the SMPS 11.

The maximum current may be provided as a table with a plurality of input voltage values, and for each of the plurality of input voltage values, a maximum current value to be used at that input voltage, e.g. to be compared with the last measured current to determine whether the power should be shut-off or the current should be limited.

Further, since the current ripple is so low when operating in the regulated ratio region, the inductor L on the secondary side of the converter 12 can be allowed to run into its non-linear region where the inductance starts to drop, with no risk of short circuiting the inductor L. This may enables a current increase in the regulated ratio region of e.g. 5 to 10% with respect to the above figures.

In a simplified embodiment, the maximum current is fixed in the regulated ratio region. The fixed current may be equal to the available current $I_{out}$ at the change from regulated ratio control to fully regulated ratio control, optionally decreased to have a safety margin and/or optionally increased to allow the converter 12 to run the inductor in its non-linear region.

The maximum current in the fully regulated ratio region may also be a fixed current e.g. equal to the available current $I_{out}$ at the maximum input voltage, optionally decreased to have a safety margin.

Alternatively, the maximum current in the fully regulated ratio region is decreasing with an increased input voltage to follow the available current $I_{out}$, optionally with a safety margin.

Figure 10:
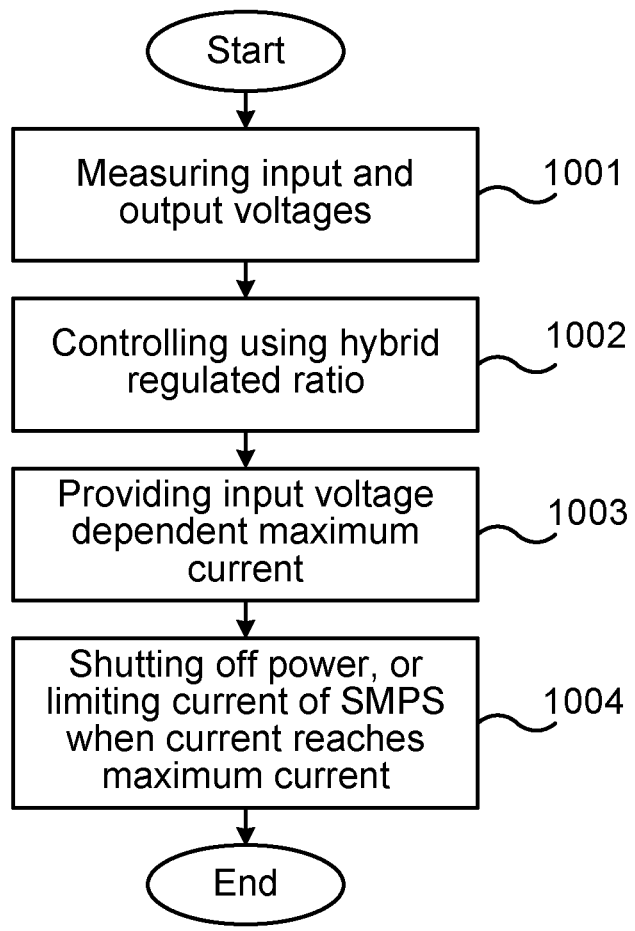
FIG. 10 is a schematic flow scheme of an embodiment of a method of operating a converter such as e.g. the converter of FIG. 3.

FIG. 10 is a schematic flow scheme of an embodiment of a method of operating a converter such as e.g. the converter of FIG. 3. According to the method, measurements of the input and output voltages are constantly being received in a step 1001. The switched mode converter is, in a step 1003, controlled depending on the received measurements of the input and output voltages in a hybrid regulated ratio control scheme. A maximum current, which is dependent on the measured input voltage, is, in a step 1003, provided, and the power of the SMPS is shut off, or the current thereof is limited, in a step 1004, when a current of the SMPS reaches the maximum current.

It shall be appreciated that the above method may be modified and/or adjusted to encompass method steps corresponding to each of the features or functions as disclosed with reference to any of FIGS. 1-9.

It shall further be appreciated that the computer program 53 of the control arrangement 16 may comprise computer-executable instructions for causing the control arrangement 16 to perform the steps of such method, modified method, or adjusted method when the computer-executable instructions are executed on the processor 51 thereof.

It shall be appreciated by a person skilled in the art that the embodiments disclosed herein are merely example embodiments, and that any details and measures are purely given as examples.

The invention claimed is:

1. A method of operating a switched mode power supply, comprising:
    determining a maximum value of an output current of said switched mode power supply dependent on an available output current $I_{out}$ equaling a saturation current $I_{sat}$ of an inductive element of said switched mode power supply reduced by half an estimate of a peak-to-peak output ripple current $I_{pk-pk}$ of said switched mode power supply; and
    limiting said output current to said maximum value or shutting off said switched mode power supply when said output current reaches said maximum value.

2. The method as recited in claim 1 wherein said maximum value of said output current decreases with an increase in an input voltage to said switched mode power supply.

3. The method as recited in claim 1 wherein said maximum value of said output current is fixed when said switched mode power supply is controlled in a regulated ratio region employing a fixed duty cycle, and said maximum value of said output current is fixed when said switched mode converter is controlled in a fully regulated ratio region maintaining a fixed output voltage.

4. The method as recited in claim 1 wherein said peak-to-peak output ripple current $I_{pk-pk}$ in a regulated ratio region of said switched mode power supply is equal to:

$$(nV_1 T_{sw}/L)(1-D_{nom})D_{nom},$$

wherein "n" represents a transformer ratio of a transformer of said switched mode power supply, "$V_1$" represents an input voltage to said switched mode power supply, "$T_{sw}$" represents a switching period of switch based circuitry of said switched mode power supply, "L" represents an inductance of said inductive element of said switched mode power supply, and "$D_{nom}$" represents a nominal duty cycle associated with said switch based circuitry.

5. The method as recited in claim 1 wherein said peak-to-peak output ripple current $I_{pk-pk}$ in a fully regulated ratio region of said switched mode power supply is equal to:

$$(T_{sw}/L)Vo(1-D)$$

wherein "$T_{sw}$" represents a switching period of switch based circuitry of said switched mode power supply, "L" represents an inductance of said inductive element of said switched mode power supply, "Vo" represents an output voltage of said switched mode power supply, and "D" represents a duty cycle associated with said switch based circuitry.

6. The method as recited in claim 1 wherein said maximum value of said output current is less than or equal to said available output current $I_{out}$.

7. The method as recited in claim 1 wherein said maximum value of said output current is selected to allow said inductive element to operate in a non-linear region when said switched mode power supply operates in a regulated ratio region, and said maximum value of said output current is less than or equal to said available output current $I_{out}$ when said switched mode power supply operates in a fully regulated ratio region.

8. The method as recited in claim 1 wherein determining said maximum value of said output current comprises determining a plurality of maximum values of said output current for a respective plurality of input voltages and selecting said maximum value therefrom.

9. The method as recited in claim 1 further comprising receiving a measurement of said output current and limiting said output current to said maximum value or shutting off said switched mode power supply when said output current reaches said maximum value.

10. A switched mode power supply, comprising:
a switched mode power converter including switch based circuitry; and
a control arrangement configured to:
determine a maximum value of an output current of said switch mode power supply dependent on an available output current $I_{out}$ equaling a saturation current $I_{sat}$ of an inductive element of said switched mode power supply reduced by half an estimate of a peak-to-peak output ripple current $I_{pk-pk}$ of said switched mode power supply, and
limit said output current to said maximum value or shut off said switch mode power supply when said output current reaches said maximum value.

11. The switched mode power supply as recited in claim 10 wherein said maximum value of said output current is configured to decrease with an increase in an input voltage to said switched mode power supply.

12. The switched mode power supply as recited in claim 10 wherein said maximum value of said output current is fixed when said switched mode power supply is controlled in a regulated ratio region employing a fixed duty cycle, and said maximum value of said output current is fixed when said switched mode converter is controlled in a fully regulated ratio region maintaining a fixed output voltage.

13. The switched mode power supply as recited in claim 10 wherein said peak-to-peak output ripple current $I_{pk-pk}$ in a regulated ratio region of said switched mode power supply is equal to:

$$(nV_1T_{sw}/L)(1-D_{nom})D_{nom},$$

wherein "n" represents a transformer ratio of a transformer of said switched mode power supply, "$V_1$" represents an input voltage to said switched mode power supply, "$T_{sw}$" represents a switching period of said switch based circuitry, "L" represents an inductance of said inductive element of said switched mode power supply, and "$D_{nom}$" represents a nominal duty cycle associated with said switch based circuitry.

14. The switched mode power supply as recited in claim 10 wherein said peak-to-peak output ripple current $I_{pk-pk}$ in a fully regulated ratio region of said switched mode power supply is equal to:

$$(T_{sw}/L)Vo(1-D)$$

wherein "$T_{sw}$" represents a switching period of said switch based circuitry, "L" represents an inductance of said inductive element of said switched mode power supply, "Vo" represents an output voltage of said switched mode power supply, and "D" represents a duty cycle associated with said switch based circuitry.

15. The switched mode power supply as recited in claim 10 wherein said maximum value of said output current is less than or equal to said available output current $I_{out}$.

16. The switched mode power supply as recited in claim 10 wherein said maximum value of said output current is configured to be selected to allow said inductive element to operate in a non-linear region when said switched mode power supply operates in a regulated ratio region, and said maximum value of said output current is less than or equal to said available output current $I_{out}$ when said switched mode power supply operates in a fully regulated ratio region.

17. The switched mode power supply as recited in claim 10 wherein said control arrangement is configured to determine said maximum value of said output current by determining a plurality of maximum values of said output current for a respective plurality of input voltages and select said maximum value therefrom.

18. The switched mode power supply as recited in claim 10 wherein said control arrangement is configured to receive a measurement of said output current and limit said output current to said maximum value or shut off said switched mode power supply when said output current reaches said maximum value.

* * * * *